United States Patent
Lallouet et al.

(10) Patent No.: US 8,755,853 B2
(45) Date of Patent: Jun. 17, 2014

(54) CONTACT ELEMENT INTENDED FOR A SUPERCONDUCTING CABLE UNIT

(75) Inventors: Nicolas Lallouet, Fiennes (FR); Sébastien Delplace, Loon-Plage (FR)

(73) Assignee: Nexans, Paris (FR)

( * ) Notice: Subject to any disclaimer, the term of this patent is extended or adjusted under 35 U.S.C. 154(b) by 162 days.

(21) Appl. No.: 13/459,368

(22) Filed: Apr. 30, 2012

(65) Prior Publication Data

US 2012/0289405 A1 Nov. 15, 2012

(30) Foreign Application Priority Data

May 11, 2011 (FR) ...................................... 11 54077
Feb. 13, 2012 (EP) ...................................... 12305158

(51) Int. Cl.
*H01L 39/24* (2006.01)

(52) U.S. Cl.
USPC ...................................... 505/220; 174/125.1

(58) Field of Classification Search
USPC .................................. 505/220, 230; 174/125.1
See application file for complete search history.

(56) References Cited

U.S. PATENT DOCUMENTS

| | | | |
|---|---|---|---|
| 2003/0154727 A1* | 8/2003 | Ashibe et al. ................... | 62/45.1 |
| 2004/0256143 A1* | 12/2004 | Ashibe et al. ............... | 174/125.1 |
| 2006/0011377 A1* | 1/2006 | Schmidt et al. ............ | 174/125.1 |
| 2007/0137881 A1 | 6/2007 | Ashibe | |
| 2010/0126748 A1 | 5/2010 | Traeholt et al. | |

OTHER PUBLICATIONS

International Search Report dated Jan. 5, 2012.
"High-temperature superconducting tri-axial power cable".

\* cited by examiner

*Primary Examiner* — Colleen Dunn
(74) *Attorney, Agent, or Firm* — Sofer & Haroun, LLP

(57) ABSTRACT

A contact element (4) provided with an electrical connection element (4A), and intended for a superconducting cable unit arranged in a refrigerant, has an electrically conductive plate intended to be borne mechanically by the unit and to be electrically connected to the cable. The plate has through slots (4E, 4E', 4E") intended to form thermal conduction baffles.

16 Claims, 6 Drawing Sheets

CONTACT ELEMENT INTENDED FOR A SUPERCONDUCTING CABLE UNIT

RELATED APPLICATIONS

This application claims the benefit of French Patent Application No. 11 54077, filed on May 11, 2011 and European Patent Application No. 12 305 158.3, filed on Feb. 13, 2012, the entirety of which are incorporated by reference.

BACKGROUND

1. Field of the Invention

The invention relates to a contact element intended for a superconducting cable unit, for medium or high voltage.

2. Description of the Related Art

A superconducting cable may comprise, around a longitudinal axis and inside a thermal jacket containing a refrigerant, a supporting central core which may be tubular and also contain a refrigerant and on which are concentrically arranged superconducting layers of phase No. 1 to phase No. N in the case of a multiphase-phase cable, usually three phase, and finally a screen layer of a neutral conductor. A dielectric layer is arranged between each superconducting layer.

At the end of a superconducting cable, the current and the voltage have to be transmitted from a part at cryogenic temperature to a part at ambient temperature. This transition has to be designed in such a way as not to transmit a significant quantity of heat by thermal conduction and not to generate significant losses by Joule's effect in the passage of the electrical current. It must also not cause electrical flashover between the parts connected to the earth or to another phase. It is therefore necessary to simultaneously manage the thermal gradient, the effects of the current and the electrical field.

Conventionally, an electrical bushing of a certain length, of the order of a meter or even more, possibly provided with a specific device for controlling the electrical field, is mounted at this end of the cable.

The patent document DE 10 2004 034 494 describes a contact element provided with an electrical connection element with a bushing ensuring the management of the electrical field. Because of its length, this bushing also ensures the management of the thermal gradient between the temperature of the refrigerant, in which the contact element is located, and the ambient temperature at the free end of the bushing.

OBJECTS AND SUMMARY

The object of she invention is to propose a contact element provided with an electrical connection element which can directly ensure the management of the thermal gradient between the temperature of the refrigerant in which a superconducting cable is located and the ambient temperature, while ensuring the passage of the current from this cable to the electrical connection element, without the need for a long bushing for managing the electrical field.

By virtue of the invention, the superconducting cable unit, which may be a termination or junction unit, is particularly simple, economical, compact and non-bulky in construction.

For this, the invention proposes a contact element provided with an electrical connection element and intended for a superconducting cable unit arranged in a refrigerant, comprising an electrically conductive plate intended to be borne mechanically by said unit and to be electrically connected to said cable, characterized in that said plate comprises through slots intended to form thermal conduction baffles.

According to a preferred embodiment, said plate is a circular disk.

Preferably, said plate comprises at least two of said slots in the form of portions of circle with the same center and different diameters, the ends of a first slot and the ends of a second slot being arranged on either side of said center.

Advantageously, said plate comprises N said slots in the form of portions of circle with the same center and different diameters, the ends of an $n^{th}$ slot and the ends of an $(n+1)$th slot be arranged on either side of said center.

Preferably, said plate is provided with orifices for the passage of said refrigerant.

Said plate may comprise an internal ring intended to be electrically connected to said cable.

Preferably, said internal ring is provided with said orifices for the passage of said refrigerant.

Said internal ring may be provided at its periphery with deformable electrically conductive elements which connect it electrically to an external ring bearing said electrical connection element.

Said deformable electrically conductive elements may be multi-contact platelets.

Said internal ring may consist of two concentric rings connected by multi-contact platelets.

The invention also relates to a superconducting cable unit comprising an external thermal and electrical insulation jacket containing said superconducting cable and comprising at least one contact element according to one of the preceding claims.

According to a preferred embodiment, said cable is contained in an internal jacket containing said refrigerant.

Preferably, said contact element is borne by at least said external jacket.

Preferably, said internal jacket is made of a thermal and electrical insulating material.

A thermal insulating foam may be arranged between said internal and external jackets.

Advantageously, only said electrical connection element protrudes from said external jacket.

BRIEF DESCRIPTION OF THE DRAWINGS

The invention is described hereinbelow in more detail with the help of figures representing only preferred embodiments of the invention.

DETAILED DESCRIPTION

Figure 1:
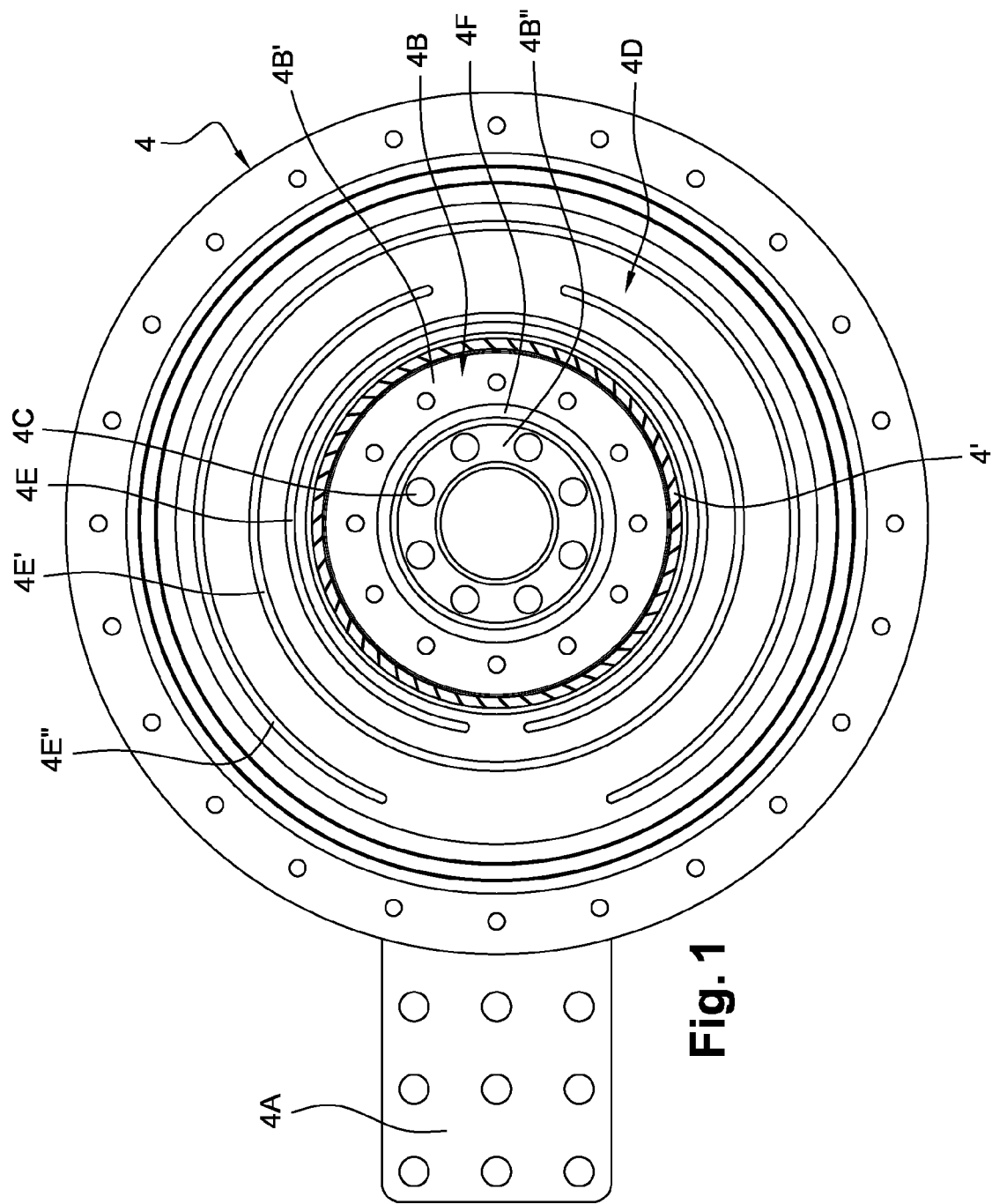
FIG. 1 is a front view of a contact element according to the invention, according to a first embodiment.

As represented in FIG. 1, according to a first embodiment, a contact element 4 provided with an electrical connection element 4A, of lug type, and intended for a superconducting cable unit arranged in a refrigerant, comprises an electrically conductive plate intended to be borne mechanically by the unit and to be electrically connected to the cable.

This plate is a metal circular disk, for example made of copper, and comprises through slots 4E, 4E' and 4E" intended to form thermal conduction baffles, in order to minimize the thermal conduction between the outside and the inside, while ensuring the passage of the electrical current.

These chicanes also result in a division of the current into two. There is then a parallel electrical resistance effect and, with equivalent thermal power by Joule's effect, each baffles can have a section divided into two, such that half the current passes through it. It is therefore possible, in a given space, to have a longer trajectory for the current and therefore better manage the thermal gradient by conduction.

The plate comprises at least two of said slots in the form of portions of circle with the same center and different diameters, the ends of a first slot and the ends of a second slot being arranged on either side of the center. The angle at the center of each portion of circle is preferably greater than 270 degrees.

According to the example represented, the plate comprises three slots but, more generally, it may comprise N said slots in the form of portions of circle with the same center and different diameters, the ends of an n.sup.th slot and the ends of an (n+1)th slot being arranged on either side of the center. A system of baffles is thus produced which is highly stable mechanically.

The number and the dimensions of these baffles are optimized by computation and/or modeling depending on the dimensions of the unit and of the current.

The plate is provided with orifices 4C intended for the passage of the refrigerant.

According to this embodiment, the plate comprises a central internal ring 4B intended to be electrically connected to the cable, for example by means of multi-contacts. This internal ring 4B is provided with orifices 4C for the passage of the refrigerant.

This internal ring 4B is provided at its periphery with deformable electrically conductive elements, which are multi-contact platelets 4', and which connect it electrically to an external peripheral ring 4D bearing the electrical connection element 4A. These deformable elements make it possible to ensure the electrical conduction while absorbing the contraction deformations caused by she temperature of she refrigerant.

This external ring 45) comprises through slots 4E, 4E' and 4E".

For mechanical mounting purposes, the internal ring 4B preferably consists of two concentric rings 4B' and 4B" connected by multi-contact platelets 4F.

Figure 2:
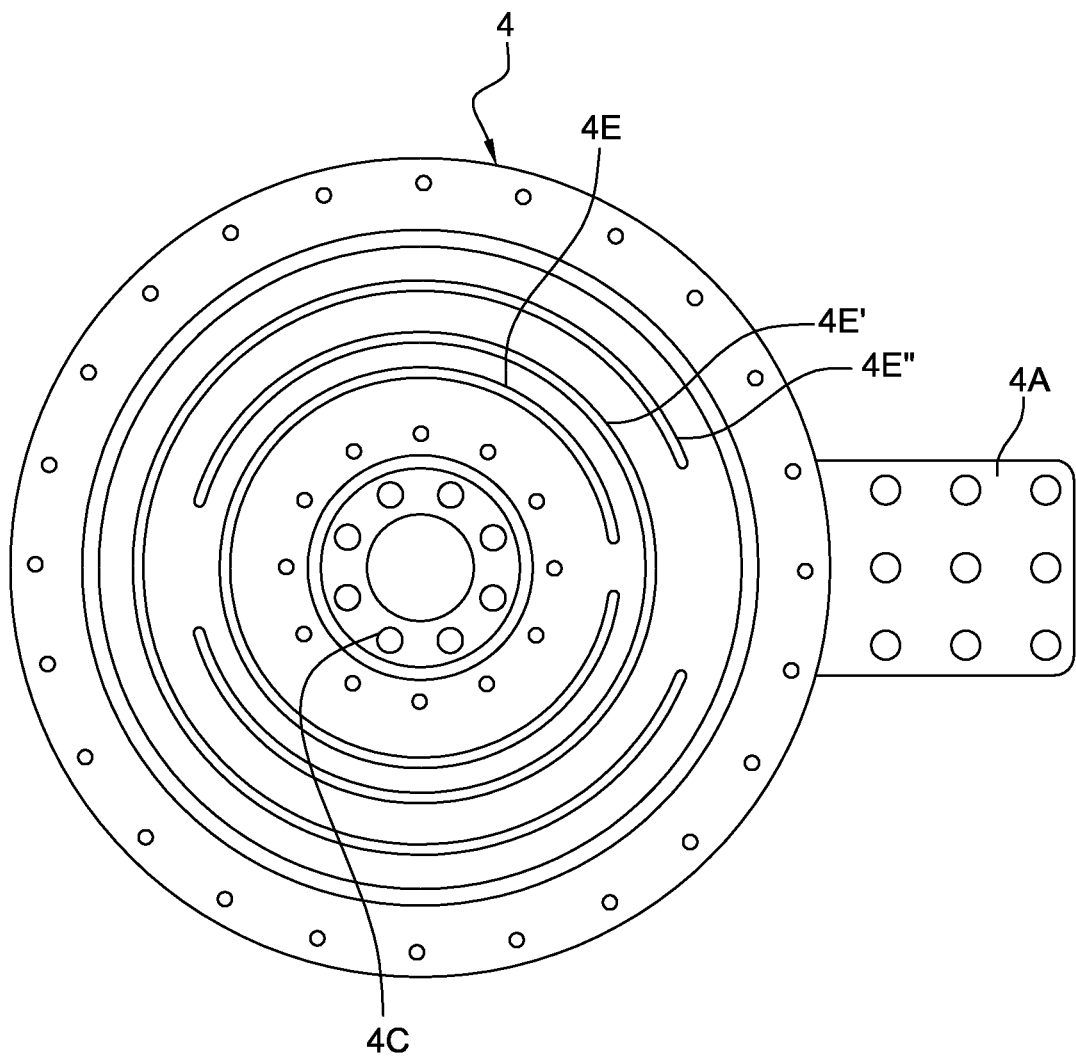
FIG. 2 is a front view of a contact element according to the invention, according to a second embodiment.

As represented in FIG. 2, according so a second embodiment, the plate may be of a single piece, without internal ring and without external ring. This difference apart, the contact element 4 represented in FIG. 2 is identical to the preceding one.

The invention also relates to a superconducting cable unit comprising an external thermal insulation jacket containing said superconducting cable and comprising at least one contact element as described previously.

Figure 3:
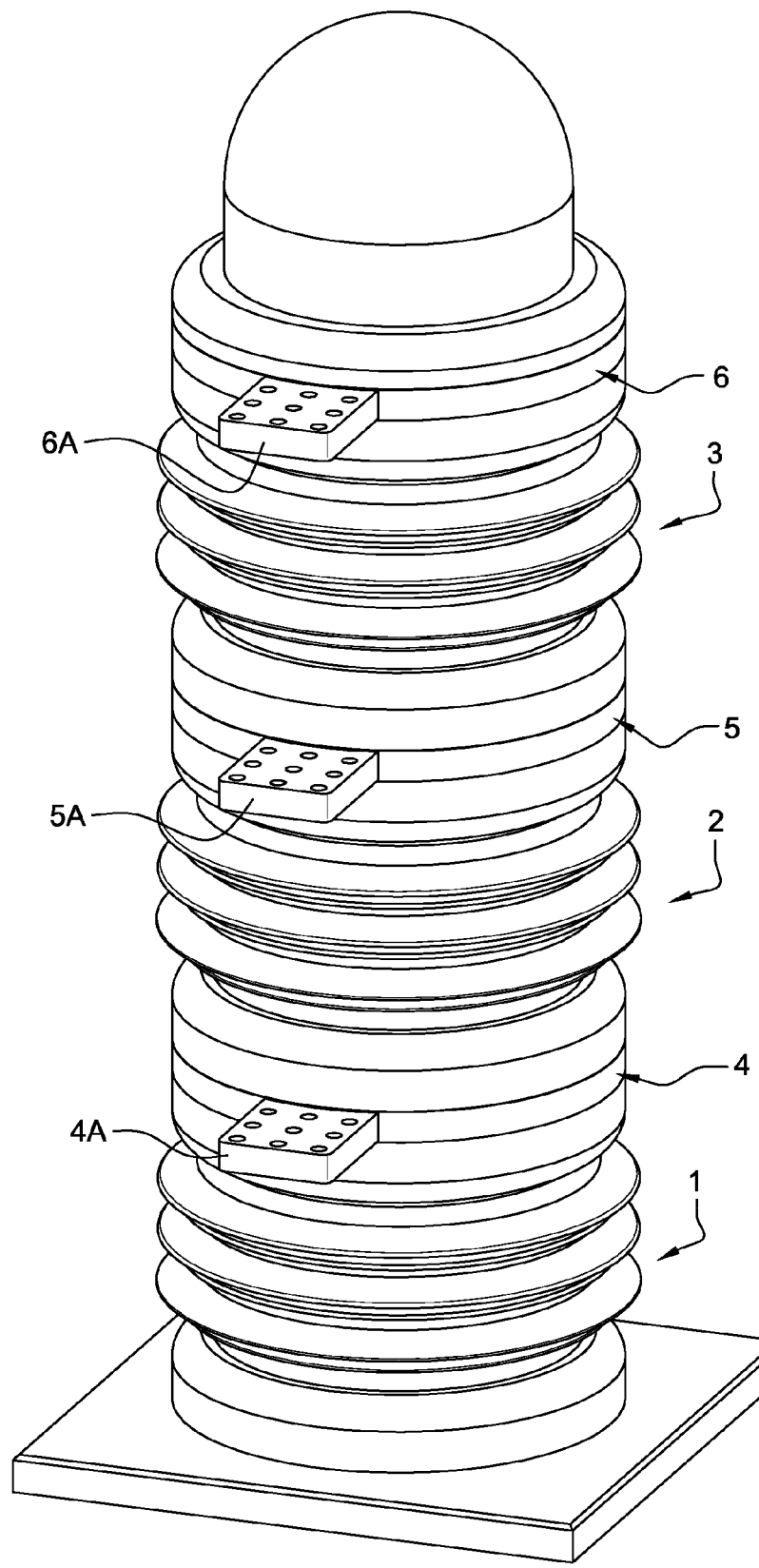
FIG. 3 is a perspective view of a termination unit of a three-phase cable according to the invention.
Figure 4:
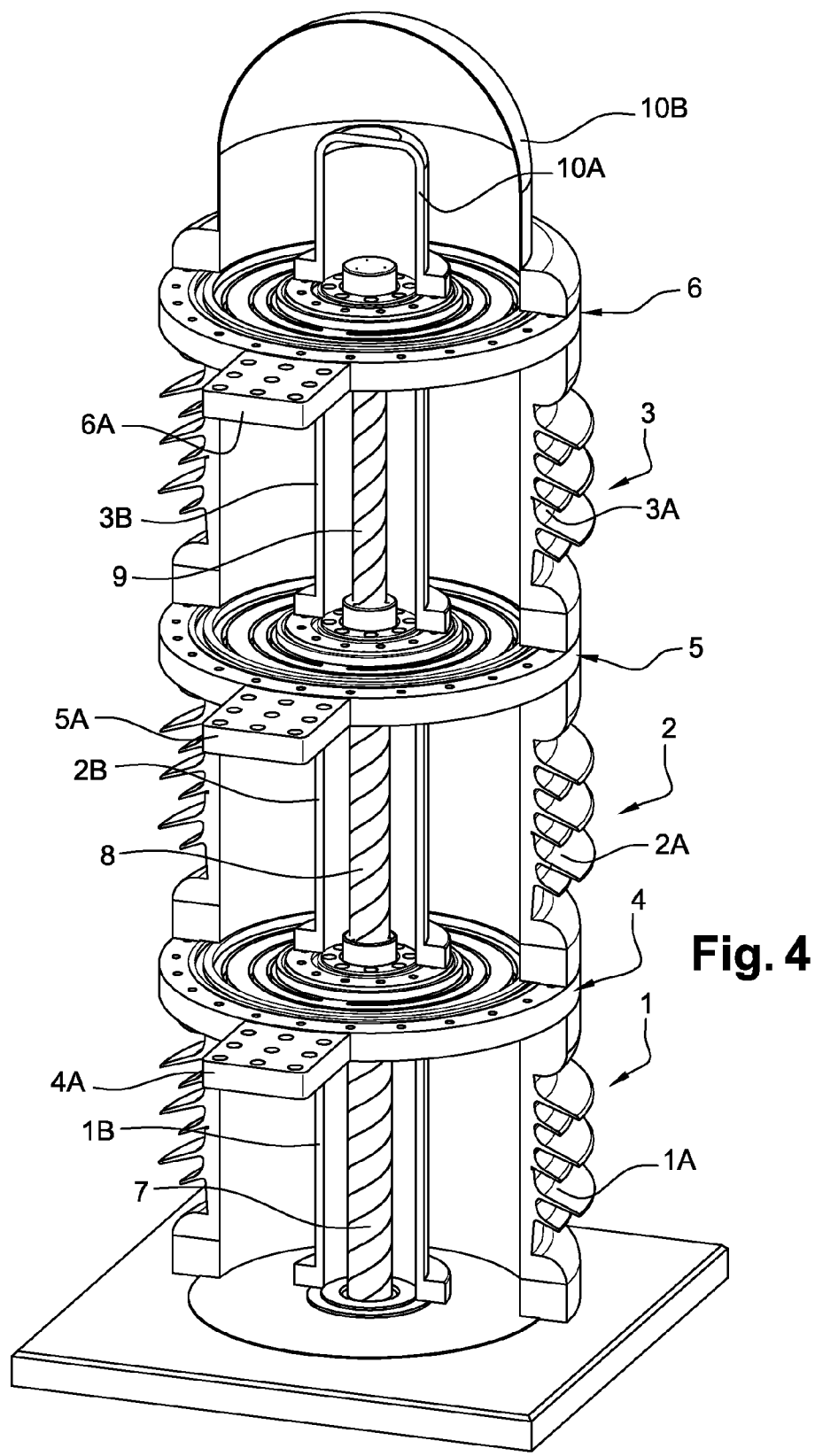
FIG. 4 is a perspective and longitudinal cross-sectional view of this termination unit.
Figure 5:
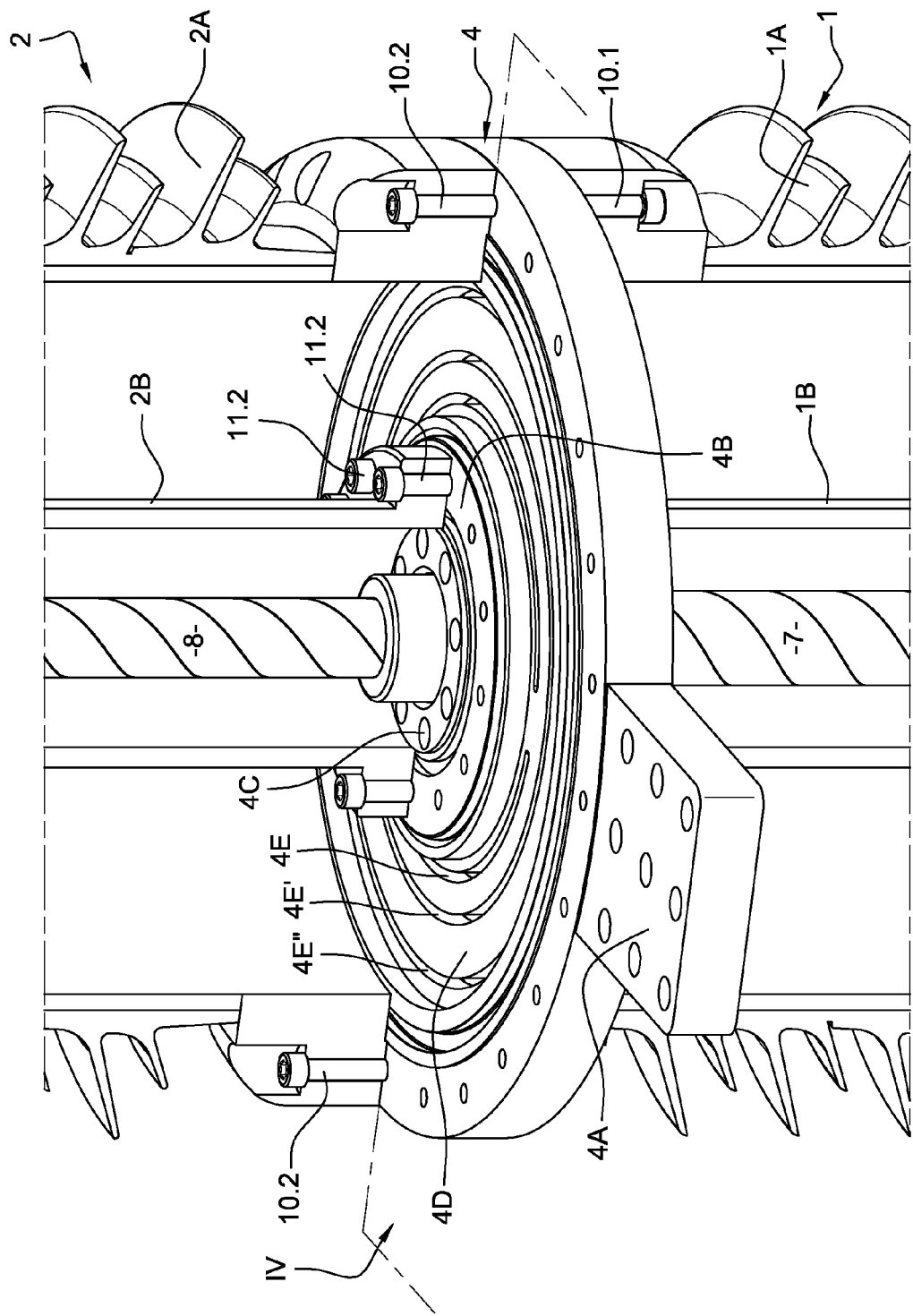
FIG. 5 is a detailed perspective and longitudinal cross-sectional view of this termination unit.

A first exemplary unit is represented in FIGS. 3 to 5.

This unit is a termination unit for a multiphase-phase superconducting cable and comprises, for each phase, a cylindrical modular element 1, 2, 3, comprising an external thermal insulation jacket made of dielectric material, for example of fiber-reinforced epoxy with fins made of silicon and provided with a metal end flange, for example made of aluminum, this jacket containing a section of superconducting cable contained in an internal jacket consisting of a dielectric material containing a refrigerant.

A contact element, for each phase 4, 5, 6 according to the first embodiment previously described and provided with an electrical connection element 4A, 5A, 6A, of lug type, is arranged at the end of each modular element 1, 2, 3, only this electrical connection element 4A, 5A, 6A protruding from the modular elements 1, 2, 3.

Modular elements and contact elements may be superposed as illustrated in FIG. 3 and termination may be vertical or modular elements and contact elements may be juxtaposed alongside one another and termination may be horizontal.

As can be seen in FIG. 4, each cylindrical modular element 1, 2, 3 therefore comprises an external thermal and electrical insulation jacket 1A, 2A, 3A containing a section of superconducting cable 7, 8, 9 contained in an internal jacket 1B, 2B, 3B containing a refrigerant, for example liquid nitrogen.

The internal jackets 1B, 2B, 3B are made of dielectric material and preferably of thermal insulating material, preferably of polymer, for example of continuous glass fabric laminate in an epoxy resin, known by the name "G10", and a thermal insulating foam which may be arranged between the internal 1B, 2B, 3B and external 1A, 2A, 3A jackets, for example glass foam or expanded polyisocyanurate.

As a variant, a vacuum of less than $10^{-1}$ millibar is produced between the internal and external jackets 1A, 2A, 3A, 1B, 2B, 3B.

The top contact element 6 corresponding to the third phase is topped by an internal cover 10A containing the refrigerant and by an external cover 10B, which may be metal, for example made of aluminum.

As can be seen in particular in FIG. 5, each contact element, for example 4, consists of an electrically conductive plate, for example made of copper or of aluminum, borne mechanically by the adjacent external jackets 1A, 2A of the adjacent modular elements, by means of screws 10.1, 10.2 passing through a corresponding flange of the jackets and the plate, and by the adjacent internal jackets 1B, 2B of the adjacent modular elements by means of screws 11.1, 11.2 passing through a corresponding flange of the jackets and the plate.

Although not represented in the figures, the interface flanges between modular elements and contact elements and provided with the screws 10.1, 10.2, 11.1 and 11.2 are provided with seals.

Figure 6:
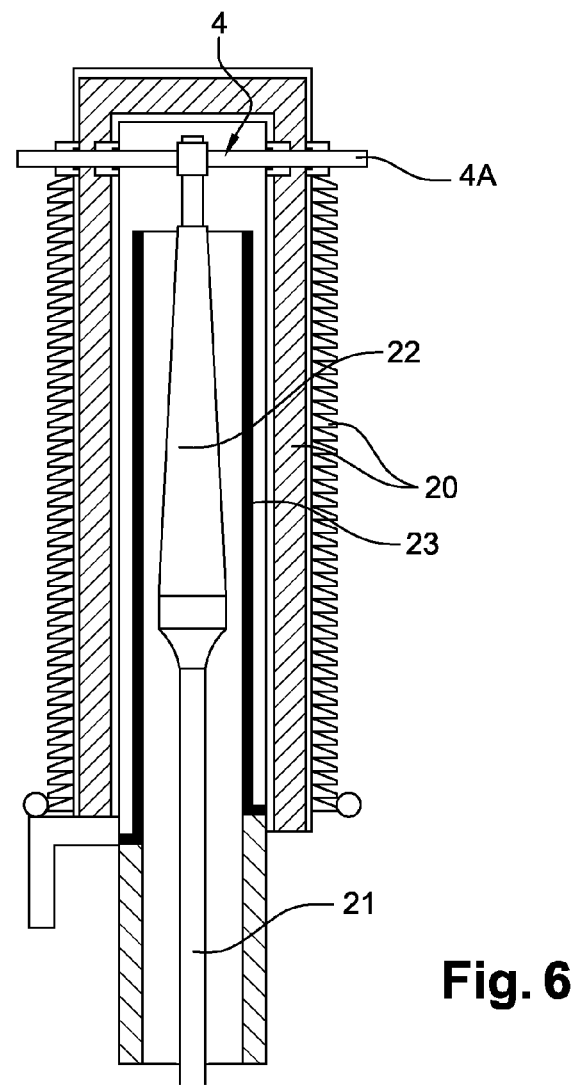
FIG. 6 is a longitudinal cross-sectional view of a termination unit of a single-phase cable according to the invention.

A second exemplary unit is represented in FIG. 6. This unit is a termination unit for a single-phase superconducting cable.

This termination unit comprises an external thermal insulation jacket 20 provided with radial fins containing a superconducting cable 21 provided with a device for controlling the electrical field 22, which may be a capacitor terminal. A tube made of electrically insulating material 23 is used for the inlet for the refrigerant into the external jacket 20.

A termination unit of this type is described in the patent document EP 2 383 854.

By virtue of the invention, a contact is produced that is particularly non-bulky at the end of this termination unit, only the electrical connection element 4A protruding from the external jacket 20.

A contact element 4 according to the first or the second embodiment described previously is mounted on the free end of the cable 21. This contact element is borne by the external jacket 20 of the unit and electrically connected to the cable 21.

Figure 7:
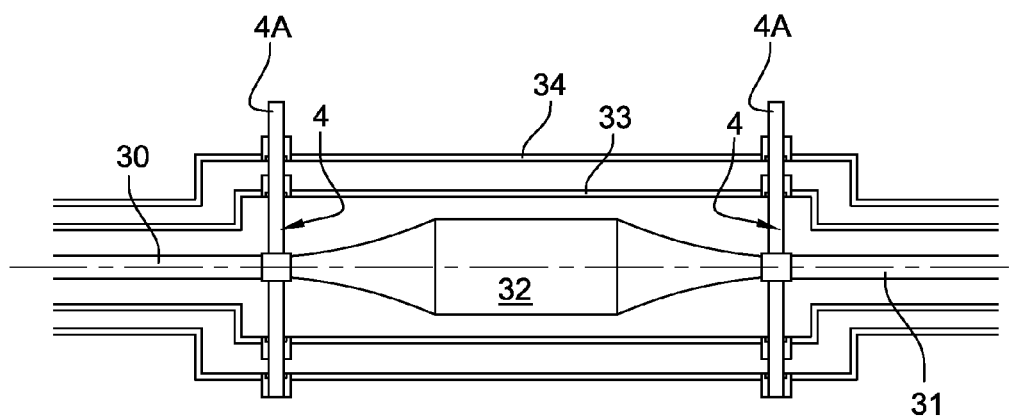
FIG. 7 is a longitudinal cross-sectional view of a single-phase cable junction unit according to the invention.

A third exemplary unit is represented in FIG. 7. This unit is a single-phase superconducting cable junction unit.

Two cables 30, 31 are connected by a connection arrangement 32. Cables and connection arrangement are contained in an internal jacket 33 containing a refrigerant and the unit comprises an external thermal insulation jacket 34.

At least one contact element 4 according to the first or the second embodiment described previously and intended for earthing is mounted on an end of one of the cables 30, 31. This contact element 4 is borne by the external jacket 34 and by the internal jacket 33 and electrically connected to the corresponding cable 30, 31.

As specifically illustrated, the junction unit may comprise a contact element 4 on each cable 30, 31, the earth screen being provided on the connection arrangement 32 or not.

By virtue of the invention, a contact element is obtained which is particularly non-bulky at the end of this junction unit, only the electrical connection element 4A protruding from the external jacket 20.

The internal jacket 33 is made of thermal insulating material and a thermal insulating foam is arranged between the internal and external jackets 33, 34.

The invention claimed is:

1. A contact element formed as an electrically conductive plate, with an electrical connection element said contact element housed within a superconducting cable unit arranged in a refrigerant and in electrical contact with a superconducting cable in said cable unit, said contact element comprising:
   through slots forming thermal conduction baffles,
   wherein the contact element is in electrical connection with the superconducting cable
   and wherein said through slots thermally conduct heat away from said superconducting cable.

2. The contact element according to claim 1, wherein said electrically conductive plate is a circular disk.

3. The contact element according to claim 1, wherein said electrically conductive plate has at least two of said slots in the form of portions of circle with the same center and different diameters, the ends of a first slot and the ends of a second slot being arranged on either side of said center.

4. The contact element according to claim 1, wherein said electrically conductive plate has N said slots in the form of portions of circle with the same center and different diameters, the ends of an $n^{th}$ slot and the ends of an $(n+1)^{th}$ slot being arranged on either side of said center.

5. The contact element according to claim 1, wherein said electrically conductive plate is provided with orifices for the passage of said refrigerant.

6. The contact element according to claim 1, wherein said electrically conductive plate has an internal ring electrically connected to said cable.

7. The contact element according to claim 6, wherein said internal ring is provided with orifices for the passage of said refrigerant.

8. The contact element according to claim 6, wherein said internal ring is provided at its periphery with deformable electrically conductive elements which connect it electrically to an external ring that supports said electrical connection element.

9. The contact element according to claim 8, wherein said deformable electrically conductive elements are multi-contact platelets.

10. The contact element according to claim 1, wherein said internal ring is made from two concentric rings connected by multi-contact platelets.

11. A superconducting cable unit comprising:
    an external thermal and electrical insulation jacket containing said superconducting cable,
    wherein said superconducting cable unit has at least one contact element according to claim 1.

12. The superconducting cable unit according to claim 11, wherein said cable is contained in an internal jacket containing said refrigerant.

13. The superconducting cable unit according to claim 11, wherein said contact element is borne by at least said external jacket.

14. The superconducting cable unit according to claim 12, wherein said internal jacket is made of a thermal and electrical insulating material.

15. The superconducting cable unit according to claim 1, wherein a thermal insulating foam is arranged between said internal and external jackets.

16. The superconducting cable unit according to claim 11, wherein only said electrical connection element protrudes from said external jacket.

* * * * *

UNITED STATES PATENT AND TRADEMARK OFFICE
CERTIFICATE OF CORRECTION

PATENT NO.      : 8,755,853 B2                                    Page 1 of 1
APPLICATION NO. : 13/459368
DATED           : June 17, 2014
INVENTOR(S)     : Lallouet et al.

It is certified that error appears in the above-identified patent and that said Letters Patent is hereby corrected as shown below:

In the Claims

Column 6, Claim 15, Line 35: Between the words "to" and "wherein" where it reads "claim 1" should be changed to say: "claim 11"

Signed and Sealed this
Nineteenth Day of August, 2014

Michelle K. Lee
*Deputy Director of the United States Patent and Trademark Office*